Patented Nov. 7, 1950

2,528,862

UNITED STATES PATENT OFFICE 2,528,862

9-PROPYLALKYLAMINO-5-ARYLAMINO-BENZO[a]PHENOXAZINES

Moses L. Crossley, Plainfield, and Richard J. Turner and Paul F. Dreisbach, Somerville, N. J., assignors to American Cyanamid Company, New York, N. Y., a corporation of Maine No Drawing. Application August 10, 1949,
Serial No. 109,625

6 Claims. (Cl. 260—244)

This invention relates to 9-propylamino-5-arylaminobenzo[a]phenoxazines and methods of preparing them. The compounds of the present invention in the form of their free bases are red dyestuffs and may be represented by the following formula:

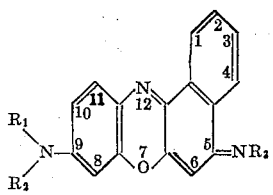

where $R_1$ is $C_3H_7$, $R_2$ is an alkyl group having 2 or 3 carbon atoms, and $R_3$ is a monocyclic aromatic hydrocarbon radical, and their addition salts with acids.

In the form of their addition salts the compounds are blue dyestuffs and may be represented by the following formula:

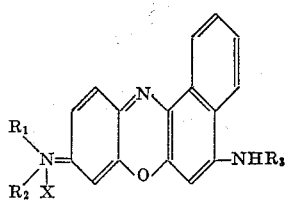

in which X, of course, is the anion. Other formulations have been proposed for the salts but the above formula is the one most closely in accord with the properties of the compounds.

The compounds of the invention, particularly in the form of their bases, show extraordinarily high activity against tubercle bacilli. The very high activity appears to be specific to the propyl group, and the change in activity is not uniform with lengthening hydrocarbon chains on the 9-amino group. The dimethylamino compounds show very low activity in mice; in many cases the activity is so low that the compound can almost be considered as inactive. 9-diethylamino compounds are more active, and the corresponding dipropyl compounds are from two to eight times as active as the diethyl compounds. Even a single propyl group results in a great increase in activity, the ethylpropyl having an activity approximately twice as high as the corresponding diethyl compound. When butyl radicals are present on the 9-amino group, the activity drops precipitately, the dibutylamino group being no more active than the dimethyl and, for all practical purposes, can be considered as inactive. In the case of the propylbutylamino compounds, the great effect of the propyl group causes the activity to rise well above that of the dibutylamino compound, but the compound is markedly less active than the preferred dipropylamino compounds.

The reason for the extraordinary effect of the propyl group, even a single propyl group, is not fully determined, and particularly the anomalous effect which is noted with lengthening the hydrocarbon chain beyond propyl has as yet no explanation. It is, therefore, not desired to limit the present invention to any theory of why the propyl group should exert so great an influence on the effectiveness of the compounds against tubercle bacilli and the butyl group such an adverse effect. It seems reasonably certain that it is not a question of fat solubility, or other lipophilic properties, because the lengthening of the hydrocarbon chain on the 9-amino group to butyl, which should increase fat solubility, destroys activity.

The aryl radical on the 5-amino group is not without effect. The p-tolyl radical produces a compound which is considerably more active than the phenyl or ethylphenyl radicals, but the difference brought about by the presence of a propyl radical on the 9-amino group still produces the same effect; namely, an activity which varies from two to eight times or more that of the diethyl. Because of their high activity and relatively low production costs, the 5-p-tolylamino compounds constitute the preferred species, although the invention is not broadly limited thereto.

The following table shows the relative average survival time of mice infected with a virulent strain of tuberculosis and treated with varying doses of 9-diethylamino, 9-ethylpropylamino and 9 - dipropylamino - 5 - arylamino benzophenoxazines. In every case the control mice, which received no drug, died, the average survival time being about two weeks. The other groups of mice were fed the dosage of the drugs for seven days mixed with their food.

the 9-dipropylamino compounds is of the order of magnitude of eight times as great as that of the corresponding 9-diethylamino compounds. The activity of the ethylpropylamino compounds is about twice that of the diethylamino. With the less active compounds, the dipropylamino compounds are at least twice as active as the diethylamino compound.

The following table shows the survival time of

TABLE I

| $R_3$ | $R_1$ and $R_2$ | Median survival time in days for doses in mg./kg./day indicated below | | | | | | |
|---|---|---|---|---|---|---|---|---|
| | | 640 | 320 | 160 | 80 | 40 | 20 | 10 |
|  | $(C_3H_7)_2$ | ---- | 127 | ---- | 66 | 42 | 26 | 20 |
|  | $C_2H_5, C_3H_7$ | ---- | ---- | ---- | >41 | 30 | 22 | 17 |
|  | $(C_2H_5)_2$ | Toxic | 44 | 35 | 28 | 22 | 19 | 16 |
| 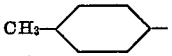 | $(C_3H_7)_2$ | ---- | >152 | ---- | 110 | 49 | 29 | 21 |
|  | $C_2H_5, C_3H_7$ | ---- | ---- | ---- | >41 | >41 | 31 | 24 |
| 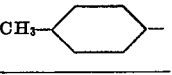 | $(C_2H_5)_2$ | 56 | 65 | 51 | 33 | 38 | 29 | 28 |
| 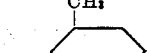 | $(C_3H_7)_2$ | ---- | ---- | ---- | 58 | 33 | 22 | 20 |
| 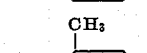 | $(C_2H_5)_2$ | 46 | 42 | 40 | 29 | 23 | 19 | 13 |
| 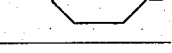 | $(C_3H_7)_2$ | ---- | ---- | ---- | 56 | 32 | 23 | 20 |
| 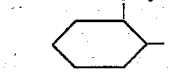 | $(C_2H_5)_2$ | 41 | 27 | 26 | 26 | 22 | 19 | 18 |
| 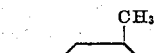 | $(C_3H_7)_2$ | ---- | ---- | ---- | 35 | 23 | 18 | 17 |
| 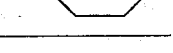 | $(C_2H_5)_2$ | ---- | ---- | ---- | 29 | 18 | 20 | 17 |
| 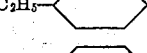 | $(C_3H_7)_2$ | ---- | ---- | ---- | 43 | 24 | 18 | 18 |
| 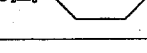 | $(C_2H_5)_2$ | ---- | ---- | ---- | 26 | 22 | 18 | 18 |
| 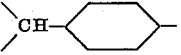 | $(C_3H_7)_2$ | ---- | >77 | ---- | 49 | ---- | 21 | ---- |

>Means that a majority of the mice are still alive on that day.

It will be noted that with the more active drugs in the higher, therapeutic doses the activity of the average mouse after treatment with a number of drugs, including substantially inactive benzophenoxazines, and the standard drug, streptomycin. Many of the figures are repeated from Table I.

TABLE II

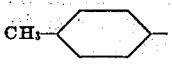

| $R_3$ | $R_1$ and $R_2$ | Median survival time in days for doses in mg./kg./day indicated below | | | | | | |
|---|---|---|---|---|---|---|---|---|
| | | 640 | 320 | 160 | 80 | 40 | 20 | 10 |
| CH₃–⟨⟩– | $(C_3H_7)_2$ | | >152 | | 110 | 49 | 29 | 21 |
| | $(C_2H_5)(C_3H_7)$ | | | | >41 | >41 | 31 | 24 |
| | $(C_2H_5)_2$ | 56 | 65 | 51 | 33 | 38 | 29 | 28 |
| | $(C_4H_9)(C_3H_7)$ | | | | >27 | >27 | 20 | 17 |
| | $(CH_3)_2$ | | | | 20 | 19 | 18 | 17 |
| | $(C_4H_9)_2$ | Toxic | | 34 | 21 | 19 | 18 | 16 |

| | Doses in mg./kg./day indicated below | | | | |
|---|---|---|---|---|---|
| | 400 | 200 | 100 | 50 | 25 |
| Streptomycin ¹ | | Toxic | 42 | 30 | 23 | 15 |

¹ Treatment for 14 days instead of 7, administration subcutaneous instead of oral.

While relative activity comparisons are useful in bringing out the similarity in the effect of the propyl group, the actual value of any drug is determined by the results obtainable with the maximum dose tolerated by the test subject. Here the advantages of the 9-dipropylamino compounds, and particularly the preferred compound, 9-dipropylamino - 5 - p - tolylaminobenzophenoxazine, are brought out most strikingly and are also illustrated by Tables I and II, giving survival time of a majority of tested mice with various drugs. As stated above the controls all die, the average being in about two weeks.

Table II shows that a majority of the mice survive a little longer when fed the dimethylamino compounds. The survival time of the average mouse increases to about 42 days for streptomycin, the most common and effective drug now in use against human tuberculosis. The 9-diethylamino-5-p-tolylaminobenzophenoxazine gives a survival time of a little over 60 days. The corresponding dipropyl compound in a dose comparable to the maximum tolerated dose for streptomycin gives an average survival of greater than 150 days. In view of the fact that the life span of a mouse is only about one-thirtieth that of man, there appears to be a fair possibility that some of the mice that receive the optimum dose of the preferred 9-di-propylamino-5-p-tolylaminobenzophenoxazine may actually be cured; something that has never occurred before with mice subjected to the extremely drastic test.

It should be noted that whereas the mice receiving streptomycin were given the drug for fourteen days after infection, those receiving the preferred drug of the present invention received it with their food for only seven days.

The effectiveness of a drug depends not only on its activity but also on its toxicity, and the tendency to develop drug-resistant strains of micro-organisms. In the case of the preferred compound of the present invention, the activity is much greater than that of streptomycin; the acute toxicity is much less; and bacteriological tests have, up to the present, shown no tendency to develop resistant strains of tubercle bacilli, which is such a marked drawback with streptomycin therapy.

The compounds of the present invention may be prepared in various ways, the invention including the compounds regardless of the process by which they are prepared. Several syntheses may be used, and it is an advantage that it is possible to prepare the compounds by a number of processes. One syntheses involves the reaction of 3,6-dipropylamino-nitrosophenol with an N-aryl substituted naphthyl amine. Another method involves the production of the 9-dipropylaminobenzophenoxazonium salt and its reaction with the corresponding mononuclear aryl amine, which attaches itself through the amino group to the 5 carbon atom of the benzophenoxazonium nucleus. This latter method is more flexible in preparing a number of the compounds of the present invention and is preferred.

As far as the ring closure step is concerned, the two processes are very similar. They involve the ring closure of compounds containing at least one nitroso and hydroxy group, the only difference being that in the first process the nitroso group is on one intermediate and the hydroxy on the other, and in the second process they are on the same intermediate. The two processes may be considered as variations of essentially the same type of ring-closing process involving splitting out hydrogen and water.

In general, the compounds of the present invention are produced in the form of their salts, such as nitrates or hydrochlorides, which are compounds dissolving in alcohol with an intense blue color. They may be transformed into the free base by alkali, forming a red-colored compound. For therapeutic use the compounds are normally administered orally in the form of their bases. The administration may advantageously be in a finely-divided form in conjunction with food.

The invention will be described in greater detail in conjunction with the following specific examples. All parts are by weight.

EXAMPLE 1

*9-di-n-propylaminobenzo[a]phenoxazonium nitrate*

A mixture of 144 parts of 2-naphthol, 82 parts of zinc chloride and 1000 parts of ethyl alcohol is heated to the reflux temperature. To the boiling solution, 242.5 parts of N,N-di-n-propyl-4-nitrosoaniline hydrochloride are added in small portions. Heating of the mixture to the boiling temperature is continued until no yellow run is detected from a drop of the solution placed on wet filter paper. After cooling, the 9-di-n-propylaminobenzo[a]phenoxazonium chloride zinc chloride double salt which precipitates is removed by filtration and dissolved in 18,000 parts of hot water. After clarification of the resulting solution, 950 parts of concentrated nitric acid are added. Upon cooling, the 9-di-n-propylaminobenzo[a]phenoxazonium nitrate which precipitates is removed, yielding, after drying at 50° C., 112 parts of product in the form of greenish plates with a coppery metallic luster.

EXAMPLE 2

*9-ethylpropylaminobenzo[a]phenoxazonium nitrate*

This product is prepared in a manner similar to that described under Example 1, except that 228.5 parts of N-ethyl-N-n-propyl-4-nitrosoaniline hydrochloride are used instead of the 242.5 parts of N,N-di-n-propyl-4-nitrosoaniline hydrochloride.

The N-ethyl-N-n-propyl-4-nitrosoaniline hydrochloride required here is prepared by adding gradually a solution of 166 parts of sodium nitrite in 300 parts of water to a cooled solution of 326 parts of N-ethyl-N-n-propylaniline in 600 parts of concentrated hydrochloric acid and 800 parts of water. After the reaction is complete, an excess of caustic soda solution is added which causes the precipitation of the nitroso base in the form of a green oil which is finally taken up in ether solution. After drying this ether solution, treatment with gaseous hydrogen chloride causes the precipitation of the hydrochloride of N-ethyl-N-n-propyl-4-nitrosoaniline which after removal by filtration is purified by recrystallization from hot ethyl alcohol, giving a yellow-green solid crystalline material.

EXAMPLE 3

*5-phenylamino-9-di-n-propylaminobenzo[a]phenoxazonium nitrate*

A mixture of 197 parts of 9-di-n-propylaminobenzo[a]phenoxazonium nitrate, prepared according to Example 1, 140 parts of aniline and 1500 parts of ethyl alcohol is warmed until complete solution results. The solution is allowed to cool and stand until precipitation of bright green needles is substantially complete. The precipitate is then separated by filtration and recrystallized from ethyl alcohol. The product is obtained in the form of the monohydrate.

The product is dissolved in acidified ethyl alcohol, producing an intensely-colored greenish-blue solution having a maximum light absorption at a wavelength of approximately 660 mμ. On addition of alkali, the solution turns red, showing a maximum absorption at 531 mμ and constitutes the free base.

EXAMPLE 4

*5-(4-methylphenylamino)-9-di-n-propylaminobenzo[a]phenoxazonium nitrate*

The procedure of Example 3 is followed, but the aniline is replaced with 160 parts of p-toluidine. The precipitate obtained consists of brownish-green needles and is in the form of the hemihydrate.

On dissolving the green needles in acidified ethyl alcohol, a blue solution is obtained which turns to the red of the free base when made alkaline with ammonium hydroxide. The absorption maxima of the blue and red solutions are at substantially the same wavelengths as in the case of the product of Example 3.

EXAMPLE 5

*5-(4-ethylphenylamino)-9-di-n-propylaminobenzo[a]phenoxazonium nitrate*

The procedure of Example 3 is followed, replacing the aniline with 182 parts of p-ethylaniline. The product is obtained in the form of bright green plates and is also a hemihydrate, as in the case of the product of the preceding example.

EXAMPLE 6

*5-(3-methylphenylamino)-9-di-n-propylaminobenzo[a]phenoxazonium nitrate*

The procedure of Example 3 is followed, substituting 160 parts of m-toluidine for the 140 parts of aniline. The product is isolated in crystalline form as brown needles, which give a blue solution in acidified ethyl alcohol, changing to red on the addition of ammonium hydroxide.

EXAMPLE 7

*5-(2-methylphenylamino)-9-di-n-propylaminobenzo[a]phenoxazonium nitrate*

The procedure of Example 3 is followed, replacing the aniline with 160 parts of o-toluidine. The product is obtained in the form of brown needles. The product shows the same color change in solution in ethyl alcohol, except that in the form of the salt the solution is a distinct greenish blue.

EXAMPLE 8

*5-(2,4-dimethylphenylamino-9-di-n-propylaminobenzo[a]phenoxazonium nitrate*

The procedure of Example 3 is followed, replacing the aniline with 182 parts of 2,4-xylidine. The initial reaction proceeds somewhat more rapidly than in the case of Example 3, but the precipitation of the crystalline product is somewhat slower. The product is recovered in the form of a brown solid, which gives a greenish-blue solution in acidified ethyl alcohol, the color changing to red as the free base is obtained by the addition of alkali.

EXAMPLE 9

5-(4-isopropylphenylamino)-9-di-n-propyl-aminobenzo[a]phenoxazonium nitrate

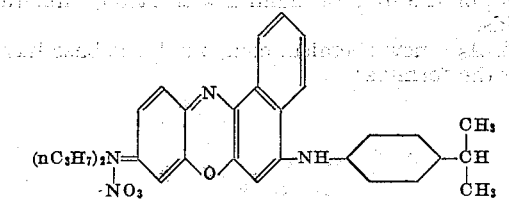

The procedure of Example 3 is followed, using 203 parts of p-isopropylaniline instead of the aniline. The reaction proceeds rapidly as in Example 8, but again the precipitation is fairly slow. The product is obtained in the form of brown crystals, which give the same blue and red solutions in alcohol at the different pH's described in the preceding examples.

EXAMPLE 10

5-(4-methylphenylamino)-9-ethylpropyl-aminobenzo[a]phenoxazonium nitrate

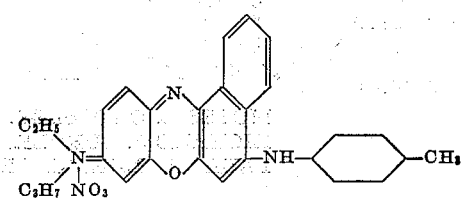

A solution of 133 parts of the product of Example 2 is dissolved in 1,000 parts of ethyl alcohol and 112 parts of p-toluidine added with stirring. The color of the solution changes from a red-blue to a green-blue, and on cooling and standing, a precipitate forms which is recovered by filtration. After re-crystallization from ethyl alcohol, the product is obtained as a purple solid, soluble in ethyl alcohol to give a blue solution under acid conditions, which solution turns to red by adding ammonium hydroxide.

EXAMPLE 11

5-phenylamino-9-ethylpropylaminobenzo[a]-phenoxazonium nitrate

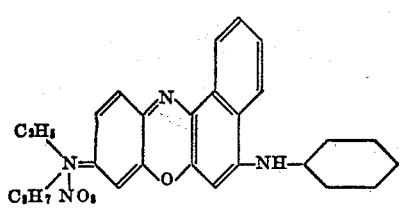

The procedure of Example 10 is followed, replacing the p-toluidine with 98 parts of aniline. The product recovered is in the form of green crystals with a metallic luster. Like the products of the preceding examples, it dissolves in alcohol, giving a blue solution under acid conditions, which turns to red on the addition of alkali.

EXAMPLE 12

5-phenylamino-9-di-n-propylaminobenzo[a]-phenoxazine base

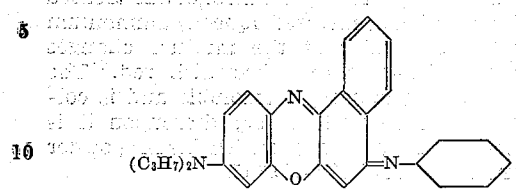

369 parts of n-propyl bromide are added to a slurry of 218 parts of m-aminophenol in 300 parts of ethyl alcohol. The reaction mixture is then heated under a gentle reflux until the reaction is complete. Alcohol and some unchanged propyl bromide are removed by distillation, and the residue poured into water and treated with sodium carbonate to separate the aminophenol derivatives. An oil layer and a water layer are formed, the former being taken up in ether, and the ether removed by distillation. The residue is added to the alcohol and unchanged propyl bromide recovered from the original reaction mixture, together with an additional 123 parts of fresh propyl bromide. The solution is then refluxed until reaction appears complete and, finally, the alcohol and a small amount of unchanged propyl bromide are removed by distillation.

The product obtained is poured into 1,000 parts of water and the mixture made alkaline by adding solid soda ash. A water-insoluble oil is produced which is removed by decantation and purified by vacuum distillation. It is a straw-colored, viscous liquid, which turns deep red on exposure to air. The product is then dissolved in 880 parts of concentrated hydrochloric acid, and 103 parts of sodium nitrite in 210 parts of water is added gradually to the solution, the temperature being maintained below 10° C. An orange-colored solid forms after the reaction is complete and is removed by filtration, washed with dilute hydrochloric acid and dried.

The orange-colored 2-nitroso-5-di-n-propyl-amino phenol is added to a solution of 169 parts of N-phenylnaphthylamine in 1,500 parts of ethyl alcohol, acidified with a little hydrochloric acid. The mixture is stirred and heated under reflux until the reaction is complete, an intensely blue-colored solution being obtained. The solution is diluted with an equal volume of ethyl alcohol and treated with an excess of concentrated ammonium hydroxide, which precipitates a slightly oily product soon solidifying to the dark greenish-colored base. This is removed by filtration and dried to a greenish powder.

The base dissolves in alcohol to form a purplish solution which can be transformed into a greenish-blue solution by the addition of hydrochloric acid. Ether is then added and the solid hydrochloride of the free base precipitated, filtered and recovered.

EXAMPLE 13

5-(4-methylphenylamino)-9-di-n-propylamino-benzo[a]phenoxazine base

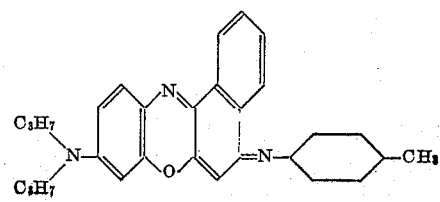

A slurry of 25 parts of 5-(4-methylphenylamino)-9-di-n-propylaminobenzophenoxazonium nitrate, prepared as described in Example 4, is slurried in 200 parts of ethyl alcohol and treated with 10 parts of concentrated aqueous ammonium hydroxide. The color of the mixture changes from a greenish-blue to a brownish red. The latter, which is the base, is insoluble and is collected and washed with water; thereupon it is dried and constitutes a greenish-black powder which melts at about 178–179° C.

EXAMPLE 14

9-n-propylisopropylaminobenzo[a]phenoxazonium nitrate

N-n-propyl-N-isopropyl-4-nitrosoaniline is prepared by following the procedure of Example 2, replacing the N-ethyl-N-n-propylaniline with the corresponding N-n-propyl-N-isopropylaniline. The product is then transformed into the benzophenoxazonium nitrate by the process of Example 1.

EXAMPLE 15

5-(4-methylphenylamino)-9-n-propylisopropylaminobenzo[a]phenoxazonium nitrate The process of Example 3 is carried out, substituting the product of Example 14 for the 9-di-n-propylamino compound used in the example. A product is obtained which dissolves in alcohol, giving a blue solution under acid conditions and a red solution under alkaline conditions.

We claim:

1. As new chemical compounds, the compounds selected from the class consisting of the bases having the formula:

in which $R_1$ is $C_3H_7$, $R_2$ is an alkyl group having more than one and not more than three carbon atoms, and $R_3$ is a benzene radical, and their addition salts with acids.

2. As a new chemical compound, the base having the following formula:

3. As new chemical compounds, the addition salts of the base of claim 2 with strong mineral acids.

4. As a new chemical compound, the base having the formula:

5. As new chemical compounds, the addition salts of the base of claim 4 with strong mineral acids.

6. As a new chemical compound, the base having the formula:

MOSES L. CROSSLEY.
RICHARD J. TURNER.
PAUL F. DREISBACH.

REFERENCES CITED

The following references are of record in the file of this patent:

UNITED STATES PATENTS

| Number | Name | Date |
|---|---|---|
| 1,570,752 | Lefebure et al. | Jan. 26, 1926 |

FOREIGN PATENTS

| Number | Country | Date |
|---|---|---|
| 60,922 | Germany | Jan. 21, 1892 |
| 68,381 | Germany | Apr. 4, 1893 |
| 556,773 | France | July 26, 1923 |
| 488,945 | Germany | Jan. 25, 1930 |